(12) United States Patent
Sanders (10) Patent No.: US 7,890,963 B2
(45) Date of Patent: Feb. 15, 2011

(54) VECTOR REPLACEMENT METHOD

(75) Inventor: Roger Sanders, Camberley (GB)

(73) Assignee: Oracle International Corporation, Redwood Shores, CA (US)

( * ) Notice: Subject to any disclaimer, the term of this patent is extended or adjusted under 35 U.S.C. 154(b) by 1020 days.

(21) Appl. No.: 11/713,348

(22) Filed: Mar. 1, 2007

(65) Prior Publication Data

US 2007/0213969 A1   Sep. 13, 2007

(30) Foreign Application Priority Data

Mar. 10, 2006   (EP) .................................. 0604893

(51) Int. Cl.
*G06F 13/00* (2006.01)
*G06F 17/30* (2006.01)

(52) U.S. Cl. ...................... 719/328; 707/781

(58) Field of Classification Search ................. 719/328; 707/781
See application file for complete search history.

(56) References Cited

U.S. PATENT DOCUMENTS

| | | | |
|---|---|---|---|
| 6,272,519 B1 | 8/2001 | Shearer, Jr. et al. | |
| 7,107,584 B2 | 9/2006 | Bond et al. | |
| 7,130,786 B2 | 10/2006 | Grebenev | |
| 7,571,448 B1 * | 8/2009 | Sallam | 719/331 |
| 2003/0097247 A1 | 5/2003 | Bond et al. | |
| 2005/0076237 A1 * | 4/2005 | Cohen et al. | 713/201 |
| 2005/0197815 A1 | 9/2005 | Grebenev | |

* cited by examiner

*Primary Examiner*—Lechi Truong
*Assistant Examiner*—Phuong N Hoang
(74) *Attorney, Agent, or Firm*—Kilpatrick Townsend & Stockton LLP (57) ABSTRACT

The present invention relates to computer-implemented method for generating one or more system calls from a command originating from a software process. The method comprises the steps of receiving the command from the software process; translating the command into a first set of system calls for execution by an operating system; intercepting said first set of system calls prior to execution by the operating system; and replacing said first set of system calls with a second set of system calls if said first set of system calls meets one or more predefined criteria. This interception and replacement may then be used to map one set of data references onto another set of data references. This mapping can provide flexible data storage, which is transparent to the software process and operating system.

28 Claims, 8 Drawing Sheets

VECTOR REPLACEMENT METHOD

BACKGROUND OF THE INVENTION

This invention relates to a computer-implemented method for generating one or more system calls from a command originating from a software process.

Figure 1:
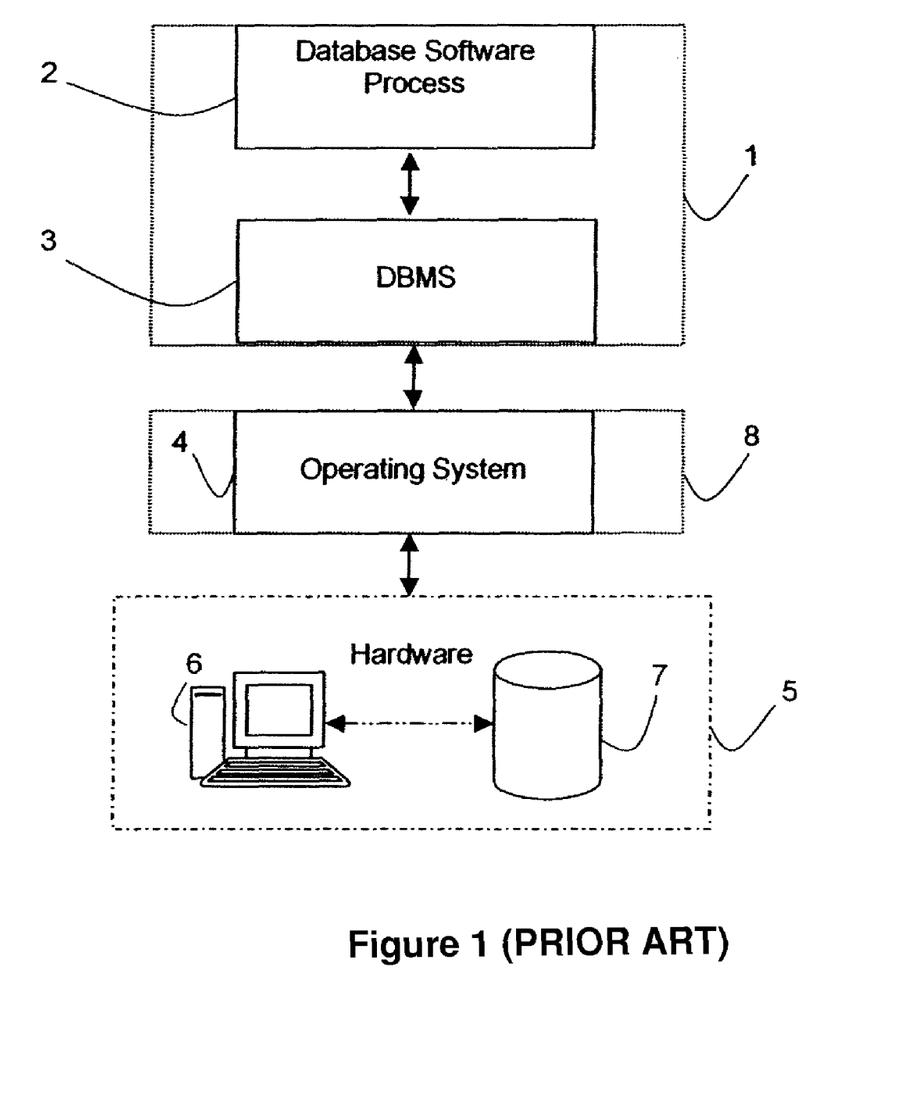
FIG. 1 shows a software process hierarchy according to the prior art.

The concept of system calls and their use within common software processes is well known. A software process can be thought of as a series of instructions that are to be implemented on a processor of a computer system. Normally, the execution of these instructions will involve accessing a multitude of additional hardware components apart from the processor, in particular memory and other data storage devices. In modern computer systems, with increasing levels of hardware and software complexity, it becomes inefficient for higher-level software processes to access and instruct hardware directly, at the level of machine code, and so a standard software hierarchy has developed. This hierarchy is illustrated in FIG. 1.

In this hierarchy the software is split into two main spaces: the kernel or operating system space 8 and a higher-level or application space 1. Within the kernel or operating system space 8 resides an operating system 4. The operating system thus provides an interface between hardware systems 5 and higher-level software processes 2, 3 operating in the application space 1. This then allows a greater flexibility in the programming of these processes and a certain level of hardware abstraction. The hardware may include any standard feature of computer systems 6 as known in the art, for example data storage devices 7.

When a software process wishes to make use of hardware 5 it utilizes a set of system calls. These system calls are a series of standard system functions that are used internally by the operating system 4; each function has a well-documented set of input arguments and returned outputs. Hence, if an application developer wishes to make use of certain hardware 5 within an application, they are able to call the system function through executing a standard line of code within the application instructions.

In the context of database solutions, the software process involves a database management system (DBMS) 3, running in the application space 1. In these situations the DBMS 3 uses a series of system calls to implement database procedures. With many such management systems, a proprietary software application 2 is configured to operate on top of core DBMS services; for example a large bespoke database may have a unique front-end yet use common data interrogation commands.

In modern database applications, implemented using any well-known DBMS as described above, it is often a problem to maintain large databases in the face of rapidly changing technological environments. For example, many companies will retain persistent database structures, such as employee records or project records, over a series of years or even decades. However, this is in contrast with the relentless pace of hardware and operating system change. This is especially the case when the database outgrows its storage limits, common with large-scale public sector projects and multimedia archives.

In the past the solution to this problem has been to constantly upgrade the hardware and software as the underlying technology changes. This piecemeal approach is well known to those in the art and indeed produces much demand in database support services to supply and configure new solutions. However, it often resorts in expensive upgrades and long downtimes at regular intervals. In regard to the problem of outgrowing storage space, new hardware devices are often added, bringing with them a lengthy process of file transfers. In regard to taking advantage of new technologies this often requires new versions of software and additional programming.

BRIEF SUMMARY OF THE INVENTION

In accordance with a first aspect of the present invention, there is provided a computer-implemented method for generating one or more system calls from a command originating from a software process, the method comprising receiving the command from the software process; translating the command into a first set of system calls for execution by an operating system; intercepting said first set of system calls prior to execution by the operating system; and replacing said first set of system calls with a second set of system calls if said first set of system calls meets one or more predefined criteria.

Hence, high-level system processes can transparently utilize a variety of system function implementations for common processes. A software process can generate a first set of system calls, which it expects will access a first piece of hardware, and through the interception and replacement of this first set of calls the current method can access a different piece of hardware, without the awareness of the software process. The first piece of hardware can thus be replaced at will without substantial modification to other software systems. Alternatively, regular operating system functions can be replaced with novel functions providing extended capabilities. Providing a set of intercept and replacement functions, which can be thought of as an intermediary level unknown to the software process, allows applications and database systems to stay constant at the higher levels while the underlying technology and access methods in the lower software layers change.

Normally, said first and second sets of system calls each comprise one or more system calls to be executed by the operating system. Typically, said first set of system calls are executed if said first set of system calls does not meet said one or more predefined criteria and said second set of system calls are executed if said first set of system calls does meet said one or more predefined criteria. The output resulting from the execution of the first or second set of system calls is typically returned to the software process.

The step of translating the command may include processing the command to produce a first set of data references and the step of replacing said first set of system calls with a second set of system calls may include mapping the first set of data references onto a second set of data references, if said first set of system calls meets said one or more predefined criteria; wherein each system call in the first set of system calls is adapted to utilize the data referenced by the first set of data references; and each system call in the second set of system calls is adapted to utilize the data referenced by the second set of data references.

Typically, prior to the first step of the claimed method, there are the steps of selecting an initial group of one or more data blocks, said one or more data blocks being stored at a first set of data locations; creating a duplicate data block for each data block in said initial group, said one or more duplicate data blocks being stored at a second set of data locations; and storing a mapping definition between the first set of data locations and the second set of data locations in a map file, said map file comprising map records detailing the location of each data block and its corresponding duplicate data block; wherein the said first set of data references refer to said initial group of one or more data blocks and the said second set of data references refer to said one or more duplicate data blocks.

Hence, a software process can be configured to access data stored or structured in a different manner to the data specified by the software process command without being aware of any modification.

Optionally, each duplicate block is stored in a compressed format. If the second set of system calls includes a system call causing a write operation on a compressed duplicate data block, said system call decompresses the duplicate data block and stores said data block in a decompressed format. It is also possible to decompress said compressed duplicate data block, edit the data contained within, and then recompress the data block and store it in a compressed format.

Hence, as typical compression ratios for data files containing a mixture of text and other data formats are around 9:1, the current method provides a large space saving without substantial modification of the original software process.

Each duplicate block may also be stored on a remotely located store, typically in a read-only format. If the second set of system calls includes a system call causing a write operation on a duplicate data block that is stored on the remotely located store, said system call may store said duplicate data block locally. Similarly, if the second set of system calls includes a system call causing a write operation on a duplicate data block that is stored in a read-only format, said system call may store said duplicate data block in a read-write format.

Hence, shared data stored over a network in a common directory can be accessed by multiple users, without modification of the software process or operating system, and without significantly altering hardware configurations. If the remotely stored files are compressed and any changes stored in decompressed files locally, then the storage space taken up on local computer systems or servers will be small.

In certain circumstances, one of the one or more predefined criteria includes detecting whether the first set of system calls accesses a database file. Typically, in these circumstances, a database kernel performs the step of translating the command. Thus, the claimed method can be applied to database files loaded within database management systems. This is advantageous as database files can easily grow to large sizes and altering database management systems is often unpractical due to the software complexity of such systems. Alternatively, the software process can further comprises one of a user interface, a software process operating on a remote computer system, an automated process, an operating system module, and an I/O device driver.

In accordance with a second aspect of the invention, there is provided a computer program comprising computer program code adapted to perform the method of the first aspect of the invention when said program is used on a computer.

In accordance with a third aspect of the invention, there is provided a computer program product comprising program code means stored on a computer readable medium for performing the method of the first aspect of the invention when said program is run on a computer.

BRIEF DESCRIPTION OF THE DRAWINGS

In accordance with a fourth aspect of the invention, there is provided a system comprising a processor adapted to perform the method of the first aspect of the invention.

An embodiment of the invention will now be described with reference to the accompanying drawings, in which.

DETAILED DESCRIPTION OF THE INVENTION

As previously described, with reference to FIG. 1, a software process, consisting of a database management system (DBMS) 3 and a database software process 2, operates in application space 1. The application space 1 may be defined as areas of computer memory in which programs reside that have restricted access to computer hardware. The software process then accesses the hardware by calling system functions within an operating system 4. The operating system 4 then has access to the hardware that was restricted to software processes within the application space 1. The system functions can also be a sequence of common processes that are executed by the operating system 4 for greater efficiency.

Figure 2:
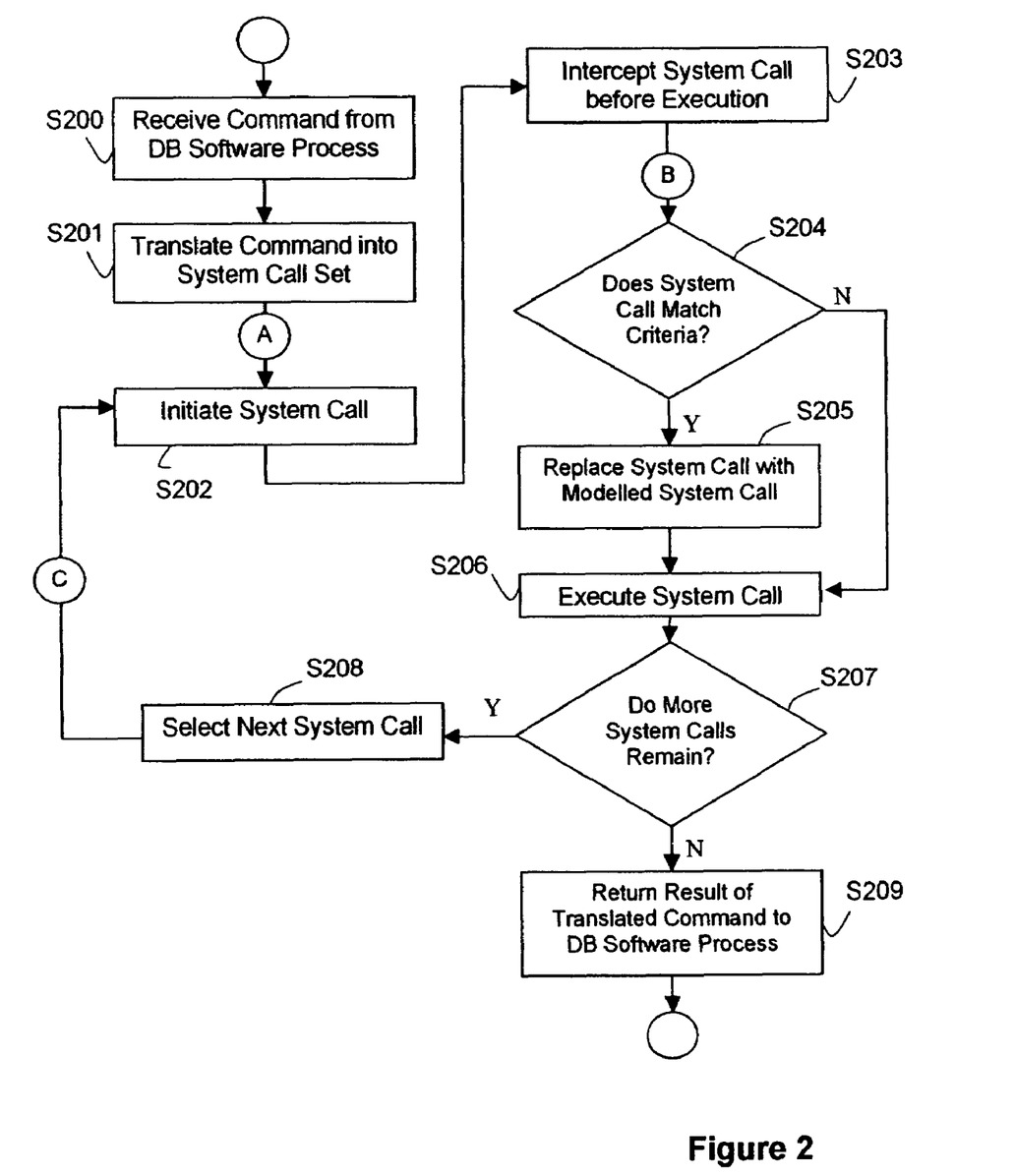
FIG. 2 shows a flowchart demonstrating a method of system call replacement according to a first embodiment of the present invention.

As before, a database software process 2 utilizes the core services of a DBMS 3 and can take multiple forms, for example, a graphical user interface (GUI), in which a user can view and interrogate data stored and managed by the DBMS 3, or alternatively, an autonomous software process, based on scheduled processes or processes dependent on changes made to the database The flow of operation, beginning with a database software process, is illustrated in FIG. 2. In the case of a GUI, the database software process 2 will receive commands from the user, which could take the form of selecting icons to open, copy or query a given set of data tables. These commands will be interpreted by the database software process and translated into commands that the DBMS 3 can understand, as illustrated in step S200. This can involve translation into the Structured Query Language (SQL) used by many relational database systems. The DBMS 3 will then take these commands and generate an appropriate set of system calls to system functions that need to be executed by the operating system 4, S201. This set may consist of one or more system calls, depending on the complexity of the process that needs to be performed.

Even though the above process has been described in relation to a database process one skilled in the art would realize that a single software process could occupy the application space 1. This process could then receive input from a user, or alternatively internally initiate certain actions, which it would then translate into a series of system calls, S201, to access services and hardware supervised by the operating system 4. This software process could take the form of a generic graphical user-interface, a software process operating on a remote computer system, an automated process, an operating system module, or an I/O device driver.

A system function will be called by running an instruction within the application space 1, containing the name of the function and any required inputs, S202. Normally, this will cause the named function to be executed, with the given inputs, by the operating system, 4. Examples of possible inputs are file names and paths, references to hardware devices, function parameters, and memory pointers. However, the current invention intercepts the system call, S203, and routes it to an intercept function, which is executed outside of the operating system 4. This can be achieved by loading the software process or DBMS 3, from an intermediary program being executed by the operating system. This intermediary program is configured to be transparent to the software process or DBMS 3, and so these latter processes operate as if initiated from within the operating system 4. However, the intermediary program will monitor all communications from the software process or DBMS 3 to the operating system 4. Alternatively the same effect can be achieved by specifying the intercept function to use the same call name as the original system function, which will result in the intercept function being executed in place of the original function.

The intercept function can take the form of a single function, which is called when any system call is intercepted, or a set of intercept functions, with each single function being executed on interception of a particular set of one or more system calls. Each intercept function is then adapted to analyze the system call and redirect it accordingly. The analysis will take the form of inspecting the details of the original system call, including the function name and its required inputs, to see whether these details match one or more predefined criteria, S204. If it is found that the details do match the one or more predefined criteria a modeled function is called, S205. This modeled function is adapted to mimic the behavior of the original system function. Alternatively, if the details do not match the predefined criteria, the intercept function calls the original system function, which is then executed by the operating system 4, S206.

After a single system call has been executed the results of the call will be returned. If the system call is part of a set, S207, the next call will be selected, S208, and the method previously described will be repeated.

The interception and replacement of system calls can allow the mapping of input and output (I/O) ports. If a system call is made by the software process, for example a print command that has an input parameter specifying a particular printer port (e.g. LPT1 or a network address) an intercept function could be adapted to intercept this print command, map one port onto another port, and use this mapped port as an input parameter to the modeled function. Alternatively, the modeled function can receive the original port as an input and print as before, but also make a backup digital copy of the document to be printed to be stored in a repository. All of these processes will again be performed without alerting the software process or operating system 4.

Many system functions take a file reference as an input, in the form of a name, path or memory pointer, to specify a particular element of data to perform the function on. By using the modeled function, it is possible to replace the original file reference with a mapped file reference, which will specify an alternate element of data. As this replacement happens outside of the awareness of the software process (e.g. the database software process 2 and the DBMS 3), the process can continually reference a persistent file in a command, yet the actual file that is accessed can vary in location and method of storage.

Figure 4:
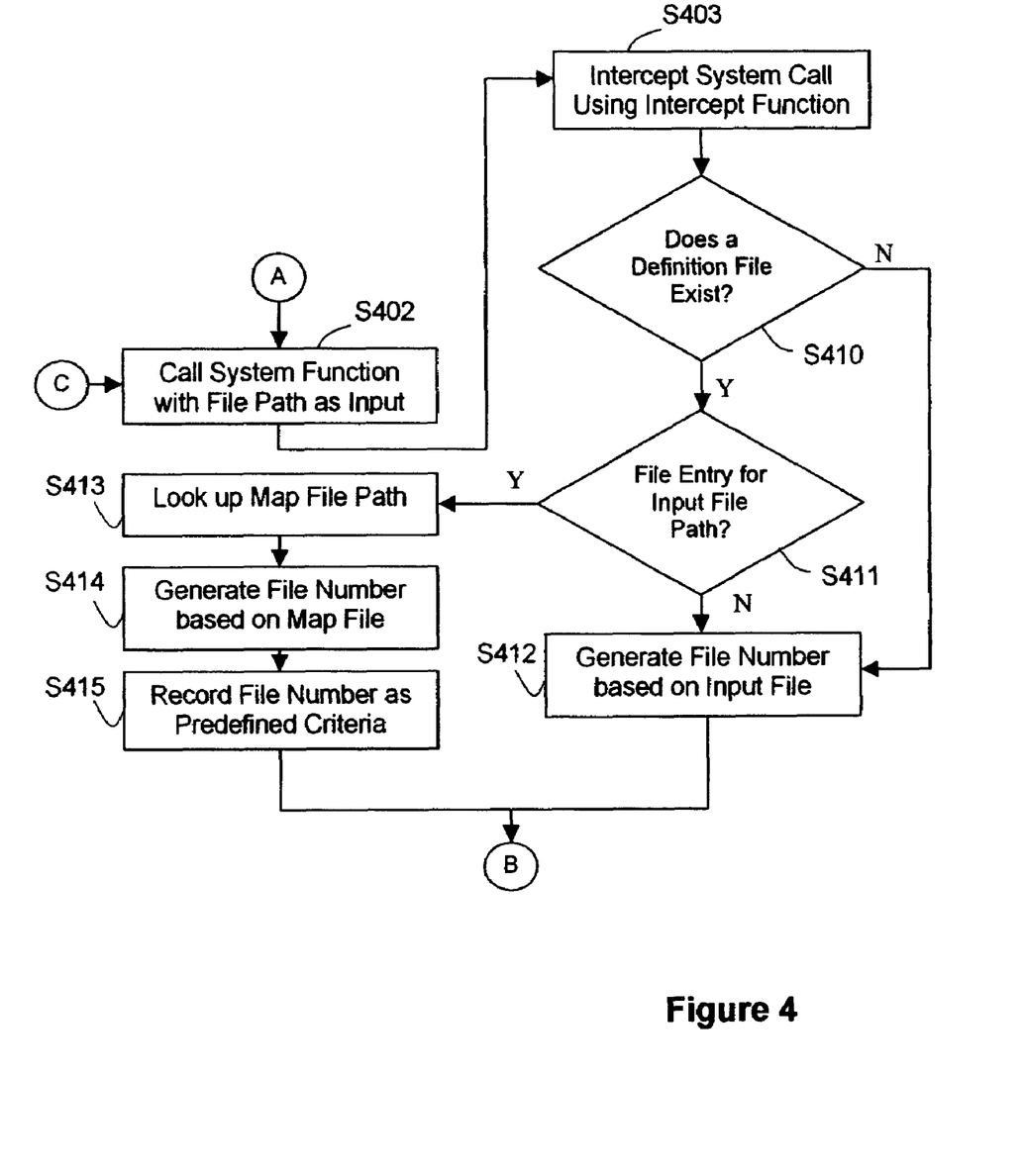
FIG. 4 shows a flowchart demonstrating the interception of system calls according to a second embodiment of the present invention.
Figure 5:
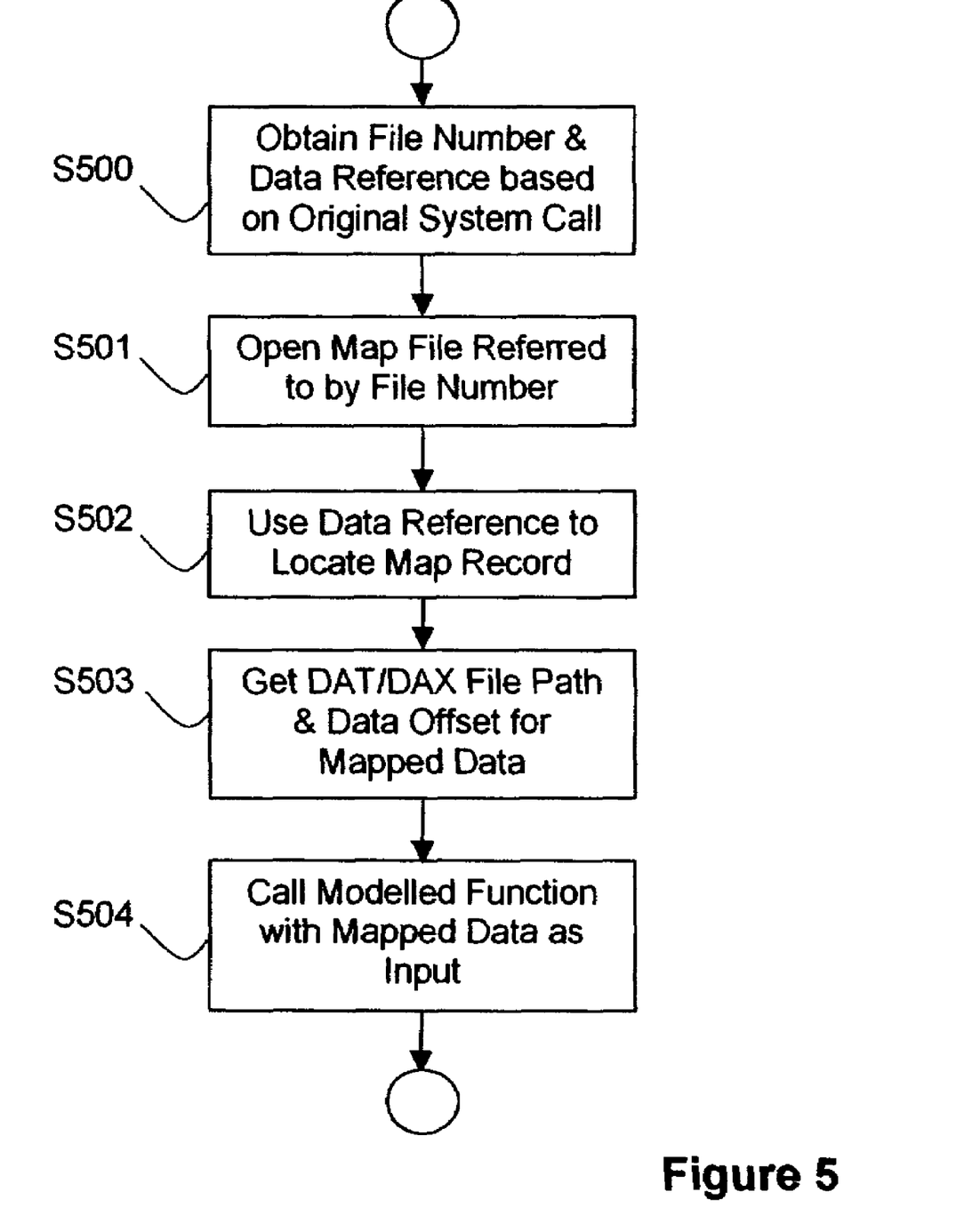
FIG. 5 shows a flowchart demonstrating the replacement of system calls according to a second embodiment of the present invention.

An example of this use of the modeled function will now be described in relation to a second embodiment of the current invention, illustrated in FIGS. 3, 4 and 5. A user interacting with a graphical user interface, operating within an employee database software process 2, clicks on a button to initiate a command to list a number of employees working under a given manager. This command is translated into a SQL query by the database software process 2 and is passed to the DBMS 3 for execution. The DBMS 3 then translates the SQL query into a set of system calls to access employee data stored at given locations on a storage medium. For example, the system calls may be calls to functions to check the status of a particular block of data, read the block of data and write the block to another location. Each function will use certain hardware controlled by the operating system, for example a hard disk, and will contain a data block or file reference for the data to be accessed.

When a system call is made it will either be intercepted by an intermediary program, within which the DBMS 3 is running, or call a function masquerading as the original system function. In either case the original function will not be executed and control will pass to an intercept function. The intercept function will then analyze the system call to see whether it meets one or more predefined criteria. In the current example, one of these criteria will be whether a referenced element of data is part of a database file we wish to map to another file.

Figure 3:
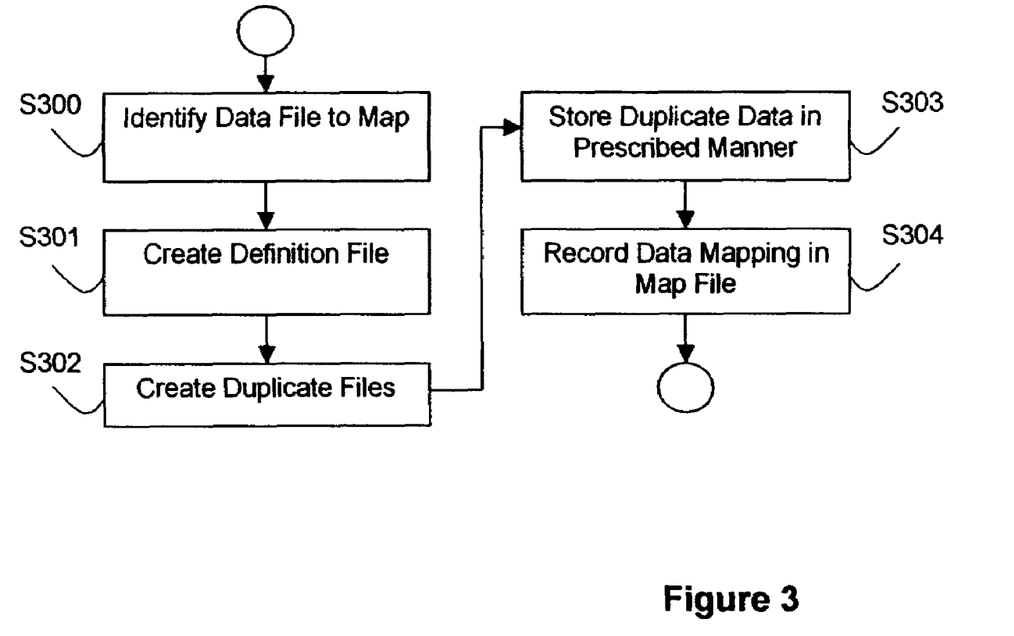
FIG. 3 shows a flowchart demonstrating a method of preparing a data file according to a second embodiment of the present invention.

The process of mapping a database file is illustrated in FIG. 3. Whilst the procedure is described using a database file, one skilled in the art would know that the method could be applied to many other types of file. A user, a system administrator, or an automatic script first identifies the database files they wish to map, S300. This can be achieved by selecting the file graphically, or entering the path of the file as an argument into the script. In a similar manner, an operator also selects a series of second locations for storing a set of mapped files that will be generated by the process. A definition file entry is then generated, S301. Each computer system employing the method of the current invention will normally store a single definition file. Therefore, if it is detected that a definition file already exists for the current system a definition entry will be added to the current file. It this is not the case then a new definition file will need to be generated. This file holds entries for all files managed by the replacement system and records the current location of the selected database file, and the chosen second locations.

An example of a definition file record is shown below:

<Original Path to database file> <Name of database file> <Path to map file directory> <Path to DAT file directory> <Path to DAX directory> <sync_flag>

The first two fields specify the first location of the database file, the subsequent three fields specify the set of second locations and the final field represents a system parameter. An automated process will then proceed to create three more files in the second set of locations specified in the definition file, S302: a map file, a data (DAT) file and a data extension (DAX) file. The DAT file is created to hold a duplicate copy of the original database file, S303. Depending on the method of data storage used, this file may comprise one or more data blocks. A DAX file will then be created corresponding to the DAT file. A DAX file is designed to store any changes made to the data subsequent to the mapping process, and so initially is empty. For example, if a change is made to a data block read from DAT file "dat1", then this change would be written to the corresponding DAX file "dax1". It is also possible for the directory containing the DAX file to be set at the time of mapping but the creation of a DAX file itself to only occur when a write is made.

Finally, the map file is created to record the mapping of each data block within the original database file, S304. This file can be structured in a similar way to the definition file. A reference to the original data block is recorded along with the path of the current mapped file and/or the location of the data block within that file. For example, if the block has not been modified since the mapping process the map record will contain a DAT file reference and the data block offset. Conversely, if the block has been modified the map record will contain a DAX file reference and the data block offset. The map records are very small, and so, for example, a 1 GB database file requires about 4 MB of map space.

If a user wishes to re-create a database file from the three files, then a build method is provided that updates the DAT file with the changes recorded in the DAX file and then reformats the DAT file as a database file.

Once a definition file is created it can be used by the intercept function to analyze the system call to see whether it meets the one or more predefined criteria. This process is illustrated in FIG. 4, which operates between steps A, B and C of FIG. 2. In normal practice, most input/output (I/O) system calls use a reference to an underlying file as an input, called a file number, rather than the exact file path. Exceptions to this rule are typically open, unlink and file statistic calls. These calls will thus be passed a file path, S402, or equivalent, and generate a file number based on the path.

The intercept function, on intercepting an 'open' system call, S403, will check whether a definition file, as described, exists, S410, and, if it does, will then check whether there is an entry corresponding to the input file path, S411. If there is, then the map file path recorded in the respective definition file entry is extracted, S413, and a file number will be generated based on this map file, S414. This number is remembered by the intercept function and stored for future reference, S415. If there is no entry then the file number is generated in the usual manner, S412, i.e. referring to the original file, and is subsequently ignored by subsequent calls to intercept functions. This file number can then become one of the predefined criteria.

All subsequent system calls based on the data in the opened file will now use the generated file number as one of its input parameters, until a final 'close' system call. These system calls will follow a similar process as that set out in FIG. 2. When a subsequent system call is made, an intercept function checks to see whether the file number obtained from the system call input parameters matches any of those stored earlier. This takes place at a point equivalent to step S204 in FIG. 2. If the check returns a match, then the modeled functions are called with the file number as an input. If the number does not match, then the original system function is called, again with the file number as input. The definition file thus dictates whether the method of system call modeling operates on all database files or simply a subset. The definition file also allows certain files to naturally be ignored by the interception and modeling, for example log or trace files in database operations. This then avoids the problem of trying to use unsuitable modeled functions on control data.

The method could also involve performing the definition file check each time a file reference is passed to system function, and thus avoid storing the file number. However, storing the number allows faster operation.

The process of replacing the system calls in the second embodiment will now be described with reference to FIG. 5. The process illustrated in FIG. 5 replaces step S205 of FIG. 2. Hence, the file number used as an input parameter for the system call will have been checked to see whether it matches a mapped file. Alternatively, if the system call were an open call the method illustrated in FIG. 4 would have been implemented. As well as a reference to a data file, a system call will also have a reference to a particular data block. The form of this reference will depend on the file system used. Thus, the intercept function can obtain a file number and a data reference from the original system call, S500. The file number is then used to find and open the map file, S501. This may be achieved by looking up information recorded in step S415 of FIG. 4, or by reversing the process that generated the file number in step S414. The data reference can then be used to locate the appropriate map record for a given data block, S502. As discussed earlier this map record will contain a DAT or a DAX file path and a data offset for the location of the data block in question, S503. The information retrieved from the map record can then be used as an input to a relevant modeled function, S504. The modeled function called will depend on the original system function called. If the modeled function is identical to the original system function then the method allows a software process to transparently perform system functions on duplicate blocks of data stored at alternate data locations.

Often software processes require valid return data from the system call to verify that the system call has been successful. In typical systems, this is in addition to a simple success or failure return flag. The intercept function is designed to return this flag to the software process or DBMS 3, after receiving the relevant return information from the modeled function call. If an error does occur when intercepting or replacing the system call, this can be returned to the DBMS 3 in the form of an error flag. This error flag will be identical to the error flag that would be returned from the original system call if an error had occurred. In certain cases this data takes the form of a valid file number. If a database file is mapped, the current method returns the file number of the map file. This is still interpreted as a valid file number by the software process as the number still refers to an active file, even though it is not the file number that would usually be returned. Thus the software process, or the DBMS 3, is not aware of any alteration of the data and presumes a normal successful execution of the original system call.

Figure 6:
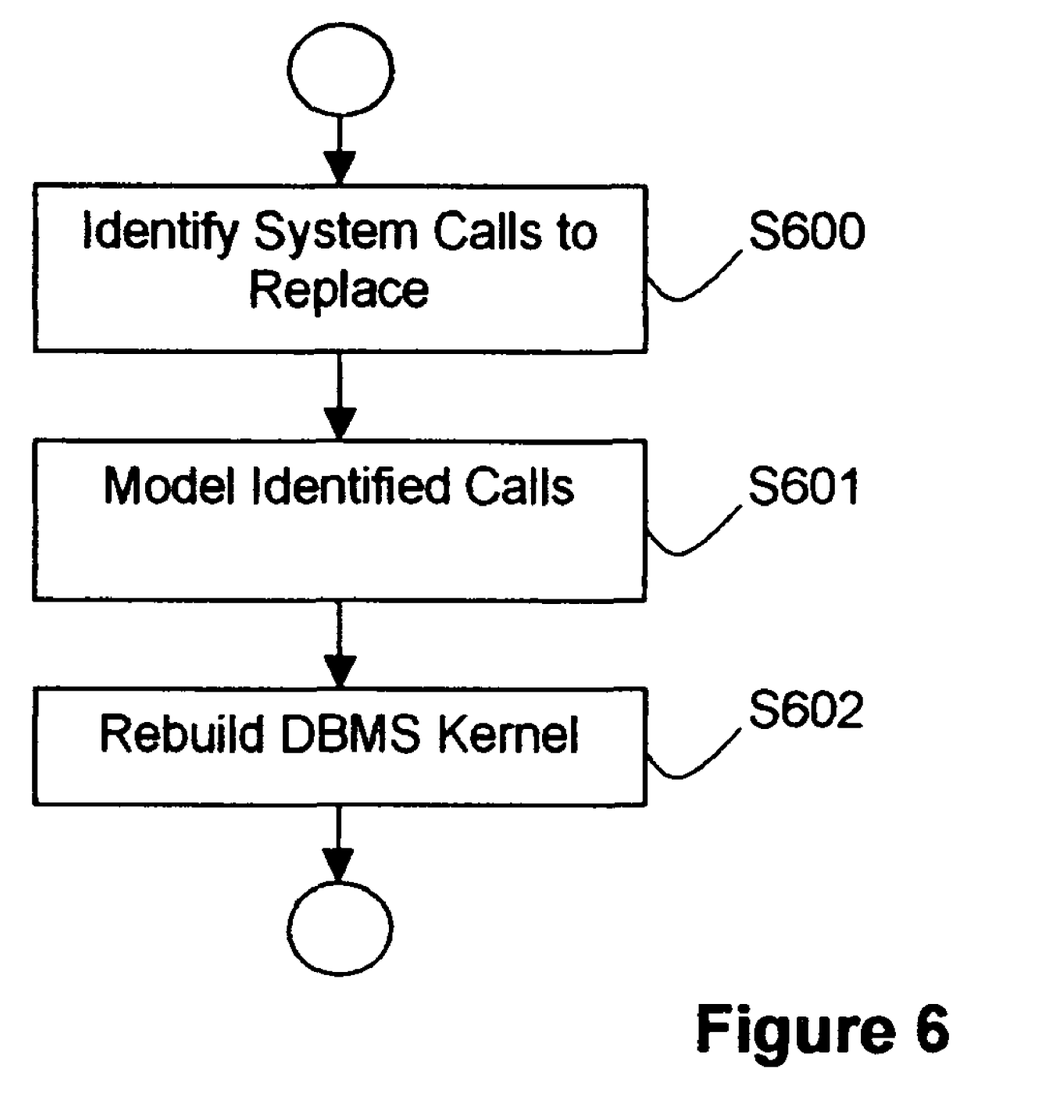
FIG. 6 shows a flowchart demonstrating further steps of preparing a computer system for system call replacement.

The process of preparing a system to use system call replacement is illustrated in FIG. 6. A user, a system administrator, or an automatic script first identifies the system calls they wish to intercept and model, S6400. This will often involve only a subset of the whole collection of possible system calls, depending on the reason for replacement. For example, if a user wishes to redirect all calls referencing a certain output device, they only need to model the calls associated with accessing this device, and so can ignore unrelated functions, such as checking the system clock or utilizing input devices.

A set of intercept functions is then generated, which again may be one function that traps all of the modeled call subset, or one or more functions, where each intercept function corresponds to each original function. The identified system calls are then modeled, S601. This involves creating a set of replacement functions. Each replacement or modeled function is configured to have identical input and output parameters as the system function it is replacing or modeling. For example, a system open function may take the address of a block of data to open as an input, and return the data contained in the block as an output. The modeled call should also take a data-block address as an input and return data as an output, but may apply additional modifications to the data stored in the block before outputting it. The important point to note is that if the method described above is implemented, and the data input has been mapped, these additional modifications performed by the modeled function will be applied every time an open call is made. The process of generating the code for a modeled function can be performed manually or automatically, using programs and methods that take the original system function as an input. Finally, on certain platforms the DBMS kernel or the operating system kernel may need to be rebuilt or restarted, S602, to activate the intercept procedure.

Operating transparently under the software process or DBMS 3 is very powerful. Take, for example, the write system call in a DBMS 3. This is a very safe call because all the latching and queuing of the data has been taken care of by the DBMS 3. At the point when the method intercepts and models the write system call, no other process anywhere can be performing a write operation on the same piece of data. It is now possible to alter the data being written, so long as subsequent read calls return the written data. Each modeled call may be different in the way they model the operation of the original system call. A command for creating a database file will provide the most complexity, in regard to the modeled calls used, as the command will span multiple system calls. Hence, references to the same data blocks in multiple calls must be confirmed to be consistent.

The current invention offers flexibility in two main functional classification areas: data structure and data storage, i.e. how data is accessed and where it is stored. The advantages and functionality conferred by the method, as described, will further be explained in relation to two further embodiments of the current invention, as illustrated in FIGS. 7 and 8.

Figure 7:
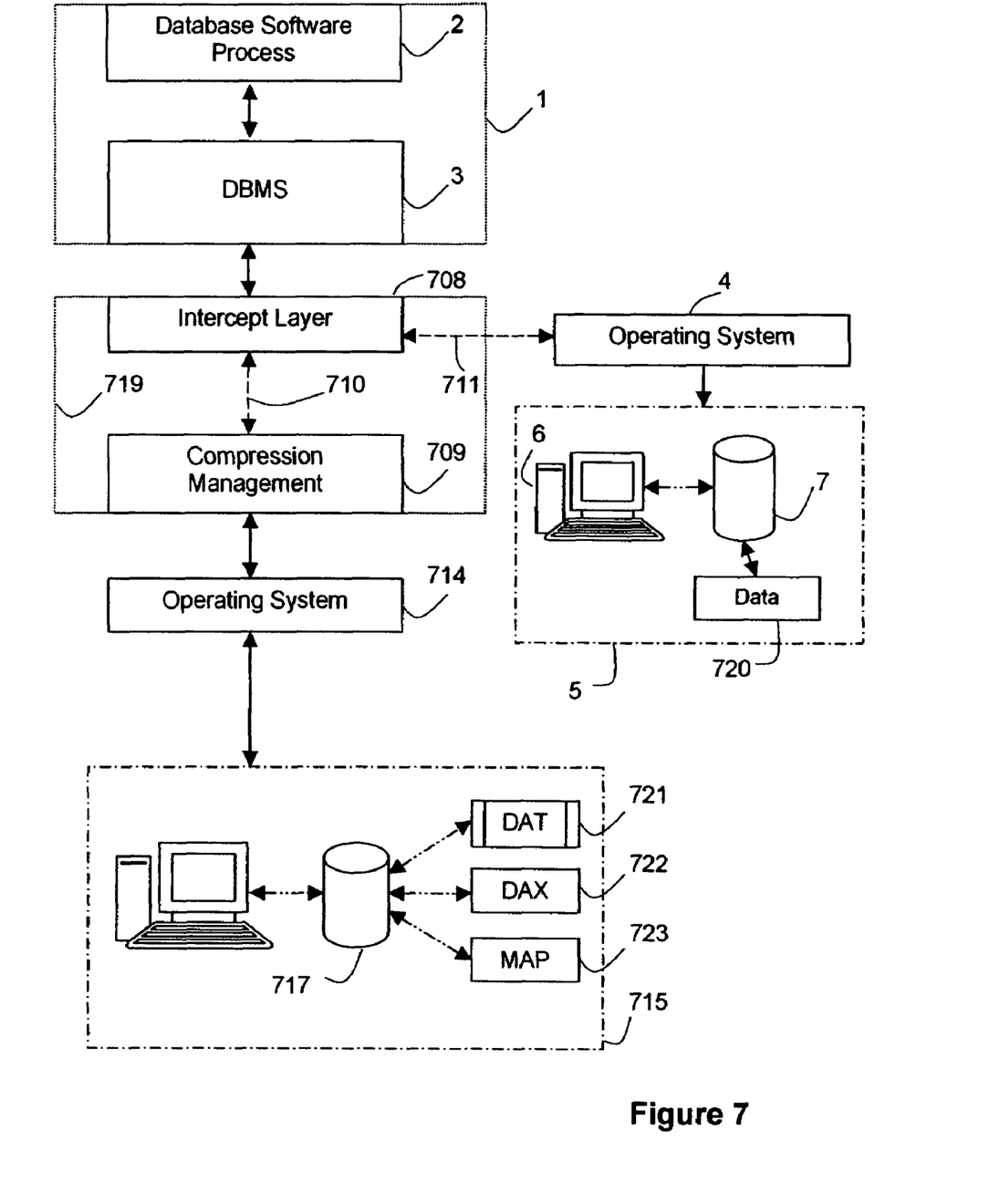
FIG. 7 shows a software process hierarchy according to a third embodiment of the present invention.
Figure 8:
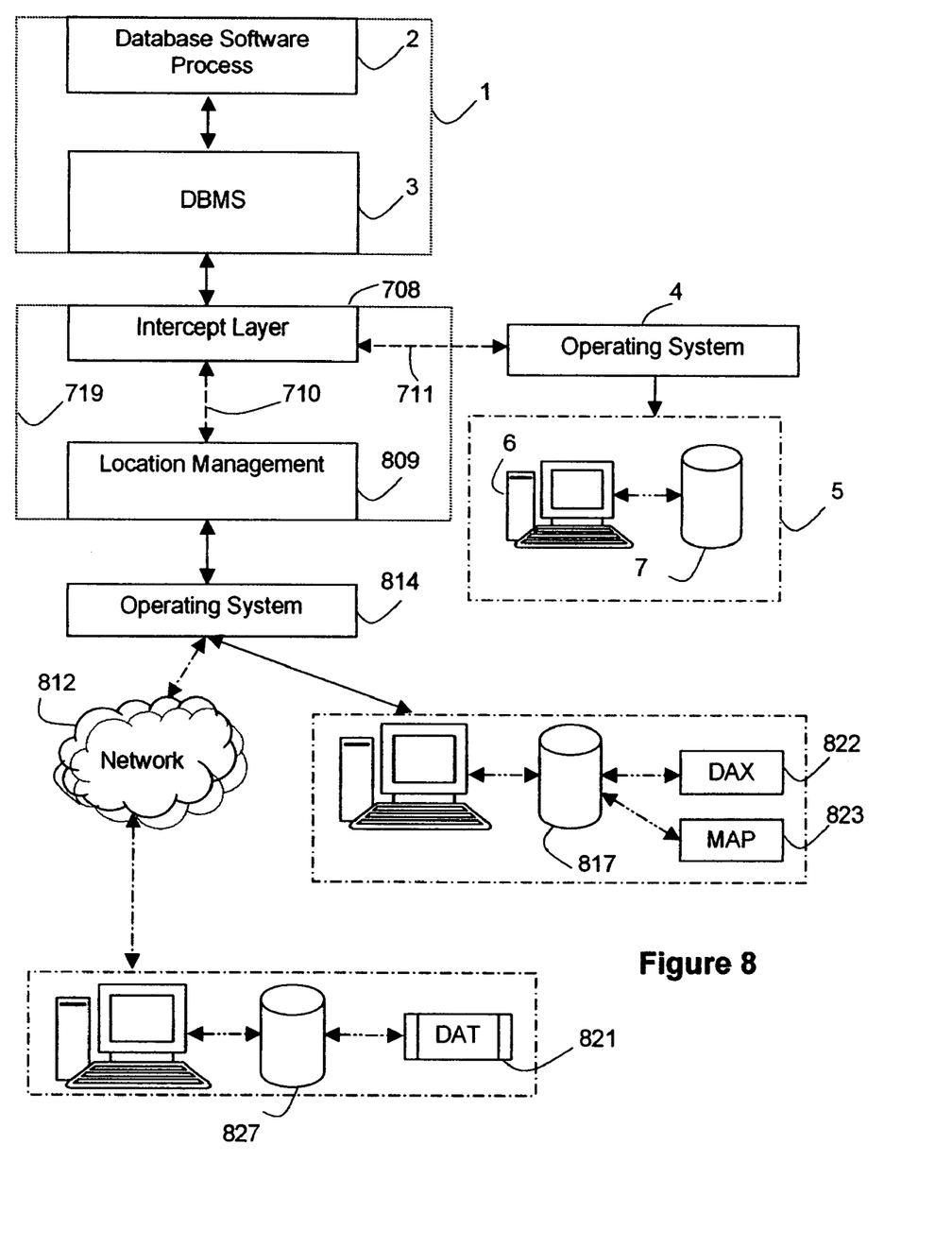
FIG. 8 shows a software process hierarchy according to a fourth embodiment of the present invention.

In both FIGS. 7 and 8, the operating system 4 and application space 1 remain. However, the use of intercept functions and system call modeling effectively adds an extra intermediary space 719, which sits between the two original spaces. Running certain intermediate software processes on top of an operating system 4, 714, and then subsequently loading the DBMS 3 or software process within these running processes, can provide this intermediary space 719. Its role is to receive the system calls originally destined for the operating system 4.

The first element of this intermediary space 719 is the Intercept Layer 708. This represents the intercept functions. When an instruction in the application space 1 calls a system function, instead of calling the appropriate function within the operating system 4, it calls a function with the same name and associated inputs within the Intercept Layer 708. As described, an intercept function will analyze the system call and the associated inputs with respect to predefined criteria before redirecting the system call to appropriate successive functions.

The third embodiment of the current invention, illustrated in FIG. 7, uses a set of modeled functions to provide flexible data structures, without the awareness of processes running in the application space 1. First, a set of files is mapped as disclosed with reference to FIG. 3. However, each DAT file 721 is stored as a compressed file and each DAX file 722 is stored as a decompressed file. The compression of the DAT file 721 is typically performed in chunks, for example of 128 kilobytes, as single block compression wastes too much space. If the DBMS 3 or operating system 4 uses standard data blocks of 8 kilobytes, up to 16 data blocks will point to the same DAT file 722. Similarly, there will be up to 16 records in the corresponding map file that share the same DAT file 722 path. Each DAT file 722 is set to be read only and is never updated. Any form of compression known in the art can be used, for example lossy and lossless compression, any standard industry implementation of the LZ algorithm such as LZ77 or LZW, the MPEG or JPEG standards or PAQ compression.

It is perfectly feasible, within the scope of the current invention, to compress data in the DAX files. However, in the current embodiment, the decision is made not to compress these files. This is because data will be written to DAX files in single data blocks and compression algorithms are not as efficient when dealing with files that are small multiples of single block (8-kilobyte) units as discussed previously. Furthermore, data blocks that have been written to DAX files will typically be frequently read. Every time a compressed block is read it would need to be decompressed, consuming valuable processor resources.

Once these files have been built and the software process in application space 1 restarted or rebuilt, the Intercept Layer 708 begins analyzing the system calls in the manner described in the second embodiment. Each file reference associated with a system call received from the application space 1 is thus checked against a definition file (not shown), wherein the definition file lists all the files with DAT and DAX files as specified above. If no entry is found in the definition file, then the call is not of interest and the system call and associated inputs are routed 711 to the operating system 4 in the standard way. These calls will operate on normal decompressed data blocks found in the original file location 7. However, if an entry in the definition file is found, then the call is of interest and the system call and associated inputs are routed 710 to a Compression Management Layer 709. This layer represents the set of modeled functions, as generated according to FIG. 6. Typically, the Intercept Layer 708 specifies the relevant modeled function that should be called in the Compression Management Layer 709. However, this could also be achieved by either the Intercept Layer 708 or the Compression Management Layer 709 calling a set function after analysis of the original system function reference.

The relevant modeled function then consults the map file 723 corresponding to the given file reference. If the file reference specifies a DAT data file 721 then the function decompresses the data, if required, and returns the correct output. This output corresponds to the output expected if no rerouting of the system call had taken place. If the modeled function involves a write operation on a data block with a DAT file mapping, then the modeled function decompresses the data block and stores it as a DAX file 722 in the location specified by the second set of locations in the definition file. The map record for this block is updated and subsequent reads will then be directed to the copy of the data block within the DAX file 722. The data blocks are added to the end of the DAX file 722, and it is the map file 723 that tracks the offset for a particular block. Habitually, in most database systems, write activity is very light. Thus the DAX files are very small. If for any reason a DAX file 722 grows significantly it is simple to rebuild a database file, using the DAT and DAX files, and then create a new DAT file and empty DAX file according to FIG. 3.

A write operation is one of the most important to model correctly, as the possibility of database or hardware failure must be accounted for. Until a system call returns back to the DBMS 3 an appropriate value or file number, the DBMS 3 will presume that the write has failed. Typically, a set of DBMS recovery algorithms will handle a partial or incomplete write. However, the Compression Management Layer 509 has to handle hardware failure at any point from when the Layer takes over to when it returns back to the DBMS 3. This is handled by the ordering of updates to the mapping and DAX files, trading off potential wasted space in the DAX file against corrupt data. This wasted space, up to a maximum of one block, will only ever occur when there is a hardware crash while the modeled functions had control of the write. A much more likely occurrence that relies on correct ordering, is running out of disk space, as the DAX files are designed to grow on demand. Algorithms within the modeled functions thus ensure writes are handled correctly as would be known in the art.

There will always be a cost associated with decompressing data, so some trade offs have to be made. As single block compression wastes too much space, it is recommended to use 128-kilobyte chunks to compromise between space and processor (CPU) activity. At first sight, 128-kilobyte chunks would appear to deliver excessive CPU cost for random access but it needs to be remembered that random access blocks are often kept in the buffer cache of the DBMS 3. It is only serial access data that is generally discarded. So once the buffer cache has been sufficiently active, the CPU cost reaches a stable state, and does not cause excessive load. For serial access, where it is highly likely that reads will access contiguous blocks, the code is optimized to cache uncompressed chunks; in most serial scans, a 128-kilobyte chunk will be uncompressed just once.

The compression of the original data file can provide a space saving of over ninety percent with regular database files. As the compression operates independently of the software process or DBMS 3, a computer system that implements the current method can save a large proportion of storage space nearly instantly, without substantial and expensive hardware upgrades nor substantial modification of the software process. The small trade-off represented in increased CPU activity can easily be accommodated with modern processor design.

A fourth embodiment of the current invention is demonstrated in FIG. 8 and a similar method to the third embodiment is presented wherein a set of modeled functions provide flexible data storage, which again operate transparently under the application layer 1. First, a set of files is again mapped as disclosed with reference to FIG. 3. However, each DAT file 821 is stored at a remote file location 827 and each DAX file 822 is stored locally. Remote file locations are those that are geographically, physically or logically distant from the computer system running the software process or DBMS 3, for example those locations connected to the computer system by a local or wide area network 812 (LAN/WAN). Communication with the remote file locations may be performed using any manner known in the art, including, but not limited to, standard TCP/IP protocol over Ethernet. Local storage 817 is known in the art to refer to locations of disk or memory that are physically close to the disk or memory locations in which the software process or DBMS 3 currently resides. The DAT and DAX files may also be compressed and decompressed as specified respectively in the third embodiment.

Frequently, the remote file locations are stored in common storage areas that are shared between multiple users, and, as such, DAT files are set to a read-only format. This common storage can be shared by multiple databases. Data block changes for a particular database instance are then stored in the locally stored DAX file 822. These files are set to a read-write format. A Location Management Layer 809 performs a similar role to the Compression Management Layer 709 in data retrieval.

It is possible to produce multiple DAX files corresponding to a particular DAT or database file. This then allows multiple back up and restore points for a database file. As each DAX file stores changes since the last mapping operation, different DAX files of different ages will represent different sets of changes to the original file. Furthermore, specifying a particular DAT/DAX file set as the active set will allow the database to be started up at the point the file set was created.

The size of each file set will depend on the number of block changes in (and hence the size of) the DAX file. Thus, if the DAT file is compressed, a series of back-up data files can be provided that use a fraction of the storage space of the original data file.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

What is claimed is:

1. A computer-implemented method for generating one or more system calls from a command originating from a software process, the method comprising:
 a) receiving the command from the software process;
 b) translating the command into a first set of system calls for execution by an operating system;
 c) intercepting said first set of system calls prior to execution by the operating system;
 d) replacing said first set of system calls with a second set of system calls if said first set of system calls meets one or more predefined criteria; and
 e) executing the first set of system calls if said first set of system calls does not meet said one or more predefined criteria or executing the second set of system calls if said first set of system calls does meet said one or more predefined criteria; wherein:
 step b) includes processing the command to produce a first set of data references;
 step d) includes mapping the first set of data references onto a second set of data references, if said first set of system calls meets said one or more predefined criteria;
 each system call in the first set of system calls is adapted to utilize data referenced by the first set of data references; and
 each system call in the second set of system calls is adapted to utilize data referenced by the second set of data references.

2. A computer-implemented method according to claim 1, wherein the first and second sets of system calls each comprise one or more system calls to be executed by the operating system.

3. A computer-implemented method according to claim 1, wherein the method further comprises a step of:
 f) returning any output resulting from the execution of the system calls in step e) to the software process.

4. A computer-implemented method according to claim 1, wherein one of the one or more predefined criteria includes detecting whether the first set of system calls accesses a database file.

5. A computer-implemented method according to claim 1, wherein step b) is performed by a database kernel.

6. A computer-implemented method according to claim 1, wherein the software process comprises one of a database management system, a user interface, a software process operating on a remote computer system, an automated process, an operating system module, and an I/O device driver.

7. A computer-implemented method for generating one or more system calls from a command originating from a software process, the method comprising:

a) receiving the command from the software process;
b) translating the command into a first set of system calls for execution by an operating system;
c) intercepting said first set of system calls prior to execution by the operating system; and
d) replacing said first set of system calls with a second set of system calls if said first set of system calls meets one or more predefined criteria;

wherein step b) includes processing the command to produce a first set of data references;

step d) includes mapping the first set of data references onto a second set of data references, if said first set of system calls meets said one or more predefined criteria;

each system call in the first set of system calls is adapted to utilize data referenced by the first set of data references; and each system call in the second set of system calls is adapted to utilize data referenced by the second set of data references; and the following steps are performed, prior to step a):

a1) selecting an initial group of one or more data blocks, said one or more data blocks being stored at a first set of data locations;

a2) creating a duplicate data block for each data block in said initial group, said one or more duplicate data blocks being stored at a second set of data locations; and a3) storing a mapping definition between the first set of data locations and the second set of data locations in a map file, said map file comprising map records detailing location of each data block and its corresponding duplicate data block;

wherein the said first set of data references refer to said initial group of one or more data blocks and the said second set of data references refer to said one or more duplicate data blocks.

8. A computer-implemented method according to claim 7, wherein step a2) further comprises storing each duplicate block in a compressed format.

9. A computer-implemented method according to claim 8, wherein if the second set of system calls includes a system call causing a write operation on a compressed duplicate data block, said system call decompresses the duplicate data block and stores said data block in a decompressed format.

10. A computer-implemented method according to claim 7, wherein step a2) further comprises storing each duplicate block on a remotely located store.

11. A computer-implemented method according to claim 10, wherein if the second set of system calls includes a system call causing a write operation on a duplicate data block that is stored on the remotely-located store, said system call stores said duplicate data block locally.

12. A computer-implemented method according to claim 7, wherein step a2) further comprises storing each duplicate block in a read-only format.

13. A computer-implemented method according to claim 12, wherein if the second set of system calls includes system call causing a write operation on duplicate data block stored in a read-only format, said system call stores said duplicate data block in a read-write format.

14. A computer program product comprising program code stored on a non-transitory computer readable medium the program code configured to perform a method for generating one or more system calls from a command originating from a software process, the method comprising:
a) receiving the command from the software process;
b) translating the command into a first set of system calls for execution by an operating system;
c) intercepting said first set of system calls prior to execution by the operating system;
d) replacing said first set of system calls with a second set of system calls if said first set of system calls meets one or more predefined criteria; and
e) executing the first set of system calls if said first set of system calls does not meet said one or more predefined criteria or executing the second set of system calls if said first set of system calls does meet said one or more predefined criteria; wherein:

step b) includes processing the command to produce a first set of data references;

step d) includes mapping the first set of data references onto a second set of data references, if said first set of system calls meets said one or more predefined criteria;

each system call in the first set of system calls is adapted to utilize data referenced by the first set of data references;

each system call in the second set of system calls is adapted to utilize data referenced by the second set of data references.

15. A computer program product according to claim 14, in which the following steps are performed, prior to step a):

a1) selecting an initial group of one or more data blocks, said one or more data blocks being stored at a first set of data locations;

a2) creating a duplicate data block for each data block in said initial group, said one or more duplicate data blocks being stored at a second set of data locations; and a3) storing a mapping definition between the first set of data locations and the second set of data locations in a map file, said map file comprising map records detailing the location of each data block and its corresponding duplicate data block;

wherein the said first set of data references refer to said initial group of one or more data blocks and the said second set of data references refer to said one or more duplicate data blocks.

16. A computer program product according to claim 15, wherein step a2) further comprises storing each duplicate block in a compressed format.

17. A computer program product according to claim 16, wherein if the second set of system calls includes a system call causing a write operation on a compressed duplicate data block, said system call decompresses the duplicate data block and stores said data block in a decompressed format.

18. A computer program product according to claim 15, wherein step a2) further comprises storing each duplicate block on a remotely located store.

19. A computer program product according to claim 18, wherein if the second set of system calls includes a system call causing a write operation on a duplicate data block that is stored on the remotely-located store, said system call stores said duplicate data block locally.

20. A computer program product according to claim 15, wherein step a2) further comprises storing each duplicate block in a read-only format.

21. A computer program product according to claim 20, wherein if the second set of system calls includes system call causing a write operation on duplicate data block stored in a read-only format, said system call stores said duplicate data block in a read-write format.

22. A computer program product according to claim 14, wherein one of the one or more predefined criteria includes detecting whether the first set of system calls accesses a database file.

23. A computer program product according to claim 14, wherein step b) is performed by a database kernel.

24. A computer program product according to claim 14, wherein the software process comprises one of a database management system, a user interface, a software process operating on a remote computer system, an automated process, an operating system module, and an I/O device driver.

25. A system comprising a processor adapted to perform a method for generating one or more system calls from a command originating from a software process, the method comprising:
   a) receiving the command from the software process;
   b) translating the command into a first set of system calls for execution by an operating system;
   c) intercepting said first set of system calls prior to execution by the operating system;
   d) replacing said first set of system calls with a second set of system calls if said first set of system calls meets one or more predefined criteria; and
   e) executing the first set of system calls if said first set of system calls does not meet said one or more predefined criteria or executing the second set of system calls if said first set of system calls does meet said one or more predefined criteria; wherein:
   step b) includes processing the command to produce a first set of data references;
   step d) includes mapping the first set of data references onto a second set of data references, if said first set of system calls meets said one or more predefined criteria;
   each system call in the first set of system calls is adapted to utilize data referenced by the first set of data references;
   each system call in the second set of system calls is adapted to utilize data referenced by the second set of data references.

26. A system according to claim 25, wherein one of the one or more predefined criteria includes detecting whether the first set of system calls accesses a database file.

27. A system according to claim 25, wherein step b) is performed by a database kernel.

28. A system according to claim 25, wherein the software process comprises one of a database management system, a user interface, a software process operating on a remote computer system, an automated process, an operating system module, and an I/O device driver.

* * * * *

UNITED STATES PATENT AND TRADEMARK OFFICE
CERTIFICATE OF CORRECTION

| | | |
|---|---|---|
| PATENT NO. | : 7,890,963 B2 | Page 1 of 1 |
| APPLICATION NO. | : 11/713348 | |
| DATED | : February 15, 2011 | |
| INVENTOR(S) | : Sanders | |

It is certified that error appears in the above-identified patent and that said Letters Patent is hereby corrected as shown below:

In column 4, line 41, after "database" insert -- . --.

In column 8, line 44, delete "S6400." and insert -- S600. --, therefor.

Signed and Sealed this
Fourth Day of October, 2011

David J. Kappos
*Director of the United States Patent and Trademark Office*